United States Patent
Kelley et al.

(10) Patent No.: US 7,610,340 B2
(45) Date of Patent: Oct. 27, 2009

(54) METHOD, SYSTEM AND STORAGE MEDIUM FOR PROVIDING INTEROPERABILITY OF EMAIL AND INSTANT MESSAGING SERVICES

(75) Inventors: Edward E. Kelley, Wappingers Falls, NY (US); Tijs Y. Wilbrink, Voorburg (NL)

(73) Assignee: International Business Machines Corporation, Armonk, NY (US)

(*) Notice: Subject to any disclaimer, the term of this patent is extended or adjusted under 35 U.S.C. 154(b) by 764 days.

(21) Appl. No.: 10/605,572

(22) Filed: Oct. 9, 2003

(65) Prior Publication Data
US 2005/0080852 A1   Apr. 14, 2005

(51) Int. Cl.
*G06F 15/16*   (2006.01)
(52) U.S. Cl. .................................................. 709/206
(58) Field of Classification Search ................ 709/203, 709/204, 206, 310, 246, 247; 370/352, 310; 340/531; 705/1, 5, 14; 713/153, 201; 379/211.02, 379/265.02; 707/5
See application file for complete search history.

(56) References Cited

U.S. PATENT DOCUMENTS

| | | | |
|---|---|---|---|
| 5,974,446 A | 10/1999 | Sonnenreich et al. | |
| 6,484,196 B1* | 11/2002 | Maurille ...................... | 709/206 |
| 6,912,564 B1* | 6/2005 | Appelman et al. ........... | 709/204 |
| 6,930,598 B2* | 8/2005 | Weiss .......................... | 340/531 |
| 7,200,634 B2* | 4/2007 | Mendiola et al. ............ | 709/204 |
| 7,269,627 B2* | 9/2007 | Knauerhase ................. | 709/206 |
| 7,336,779 B2* | 2/2008 | Boyer et al. ............ | 379/265.02 |
| 7,525,951 B2* | 4/2009 | Musil et al. .................. | 370/352 |
| 2001/0003202 A1* | 6/2001 | Mache et al. ................ | 713/153 |
| 2002/0065887 A1 | 5/2002 | Paik et al. | |
| 2002/0099777 A1 | 7/2002 | Gupta et al. | |
| 2002/0123912 A1* | 9/2002 | Subramanian et al. ......... | 705/5 |
| 2003/0009595 A1* | 1/2003 | Collins ....................... | 709/247 |
| 2003/0018718 A1 | 1/2003 | Maehiro | |
| 2003/0037112 A1 | 2/2003 | Fitzpatrick et al. | |
| 2003/0110211 A1* | 6/2003 | Danon ......................... | 709/203 |
| 2003/0229722 A1* | 12/2003 | Beyda ......................... | 709/310 |
| 2004/0015610 A1* | 1/2004 | Treadwell ................... | 709/246 |
| 2004/0054736 A1* | 3/2004 | Daniell et al. ............... | 709/206 |
| 2004/0128356 A1* | 7/2004 | Bernstein et al. ............ | 709/206 |
| 2004/0128540 A1* | 7/2004 | Roskind ...................... | 713/201 |
| 2004/0158610 A1* | 8/2004 | Davis et al. ................. | 709/206 |
| 2004/0177118 A1* | 9/2004 | Mason et al. ............... | 709/206 |
| 2004/0202117 A1* | 10/2004 | Wilson et al. ............... | 370/310 |
| 2004/0210450 A1* | 10/2004 | Atencio et al. ................. | 705/1 |
| 2004/0215721 A1* | 10/2004 | Szeto et al. ................. | 709/204 |
| 2005/0030937 A1* | 2/2005 | Wick et al. .................. | 370/352 |

(Continued)

*Primary Examiner*—Dustin Nguyen
(74) *Attorney, Agent, or Firm*—Cantor Colburn LLP; Ronald Kaschak

(57) ABSTRACT

An exemplary embodiment of the invention relates to a method, system, and storage medium for providing interoperability of email and instant messaging services. The method includes receiving a request by an email recipient to respond to an email message using an instant message application, retrieving an instant message address for the email sender from storage, and associating the instant message address of the email sender with an instant message composed by the email recipient. The retrieval of the instant message address for the email sender is accomplished by mapping the email sender's address with a corresponding instant message address for the email sender. The method further includes transmitting the instant message to the instant message address using the message application. Other embodiments include a system and a storage medium.

20 Claims, 13 Drawing Sheets

U.S. PATENT DOCUMENTS

| | | | |
|---|---|---|---|
| 2005/0154640 A1* | 7/2005 | Kolluri et al. | 705/14 |
| 2005/0283474 A1* | 12/2005 | Francis et al. | 707/5 |
| 2006/0177034 A1* | 8/2006 | Reding et al. | 379/211.02 |
| 2007/0283047 A1* | 12/2007 | Theis et al. | 709/246 |
| 2008/0005247 A9* | 1/2008 | Khoo | 709/206 |

* cited by examiner

METHOD, SYSTEM AND STORAGE MEDIUM FOR PROVIDING INTEROPERABILITY OF EMAIL AND INSTANT MESSAGING SERVICES

BACKGROUND OF INVENTION

The present invention relates generally to electronic messaging tools and, more particularly, to a method, system, and storage medium for providing interoperability of email and instant messaging services.

In response to sending emails, one often receives replies consisting of a few lines of text or comment. Over a short period of time, a single email can grow in size at an enormous rate where the sender and the receiver/responder engage in numerous exchanges. Likewise, the size of the email inbox continues to grow with each email transmission and receipt. With regular activity the user's inbox can become bogged down, affecting system performance and saturating the system's storage capacity. Another disadvantage of email messaging systems is that most individuals do not run their email programs continuously throughout the day but rather access their email messages on a periodic basis. If a sender of an email requires an immediate response, an email messaging system is not the optimal means of communication. In this instance, it may be preferable to switch to an instant messaging system rather than relying on email. However, in doing so the user will lose the historical email data (e.g., previous email text, attachments, individual contact data associated with the email communication, etc.) that is stored in the email system which may have been useful in continuing the communications. Generally speaking, when an individual wishes to send a large message, the preferred method of communication is email, while shorter and more interactive messages lend themselves best to instant messaging due to its ability to deliver quick conversation-like responses that are similar in nature to a real live conversation. Thus, there are advantages and disadvantages to using either of these messaging systems.

Accordingly, it would be desirable to be able to enable a user of messaging systems to be able to switch between email and instant messaging without losing the historical message data, attachments, or lists of people that were sent the email.

SUMMARY OF INVENTION

The foregoing discussed drawbacks and deficiencies of the prior art are overcome or alleviated by a method for providing interoperability of email and instant messaging services. In an exemplary embodiment, the method receiving a request by an email recipient to respond to an email message using an instant message application, retrieving an instant message address for the email sender from storage, and associating the instant message address of the email sender with an instant message composed by the email recipient. The retrieval of the instant message address for the email sender is accomplished by mapping the email sender's address with a corresponding instant message address for the email sender. The method further includes transmitting the instant message to the instant message address using the instant message application. Other embodiments include a system and a storage medium.

BRIEF DESCRIPTION OF DRAWINGS

Referring to the exemplary drawings wherein like elements are numbered alike in the several FIGURES.

DETAILED DESCRIPTION

Disclosed herein is a method, system, and storage medium for providing interoperability of email and instant messaging systems via an integrated messaging system. The integrated messaging system enables users of email and instant messaging systems to work interoperably, allowing them to switch between messaging systems, in order to improve overall communicational efficiency.

Figure 1:
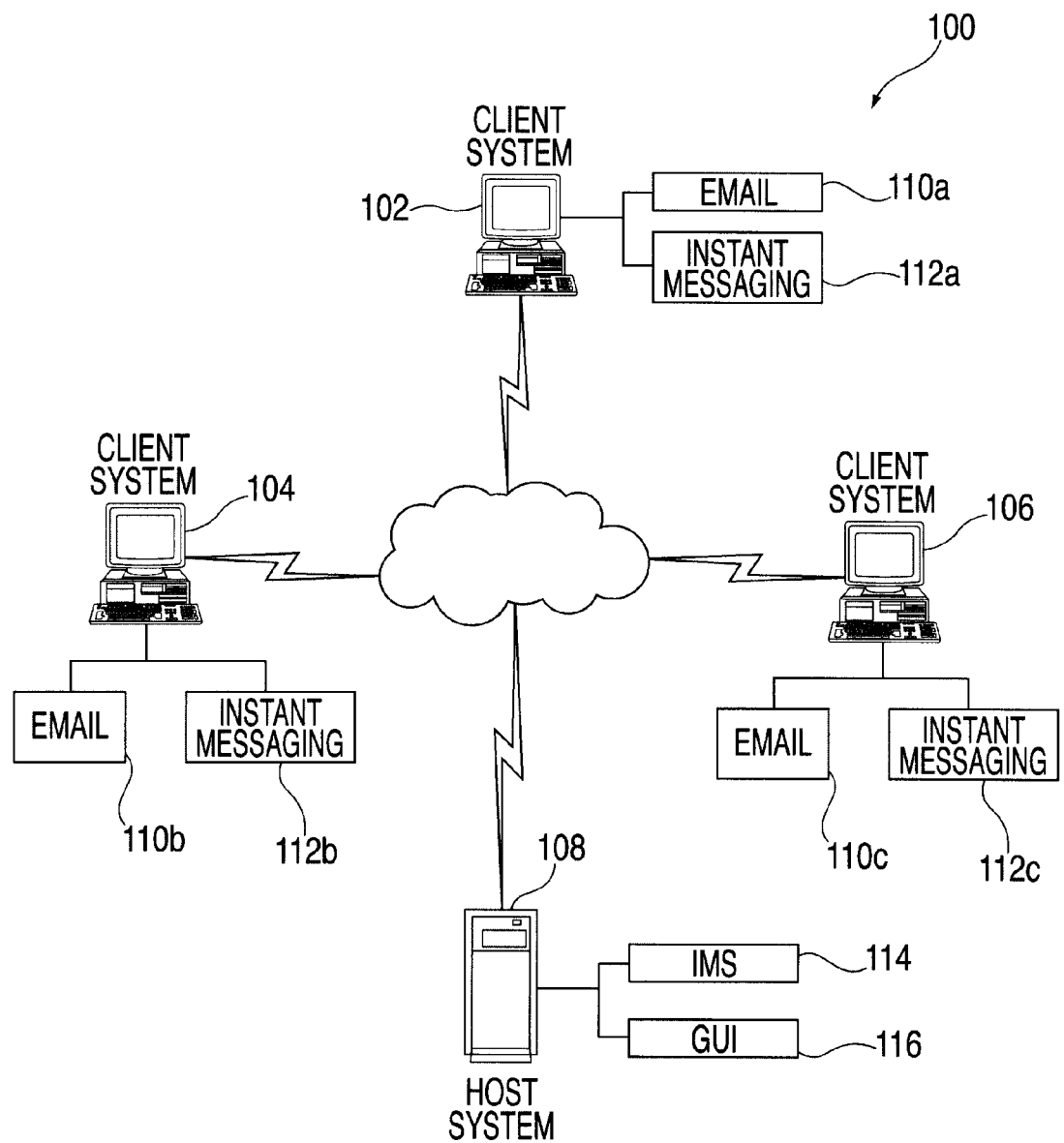
FIG. 1 is a block diagram of a system upon which the integrated messaging system is implemented in accordance with an embodiment of the invention.

Referring initially to FIG. 1, there is shown a block diagram of a network system for implementing the integrated messaging system. Network system 100 includes three computer client systems 102-106 in communication with a host system 108 via a network connection. Computer client systems 102-106 are operated by email and instant message applications subscribers as described further herein.

Computer client systems 102-106 may be general purpose desktop computers that subscribe to an Internet service provider and each include operating system software, an email application 110a-c, an instant messaging application 112a-c, and any other suitable programs that reside in memory and execute on computer client systems 102-106. It will be understood by those skilled in the art that the integrated messaging system of the invention may be executed on computer systems with variant architectures. Computer client systems 102-106 are in communication with host system 108 via a network connection such as the Internet or other suitable means of networking architecture.

In one embodiment, host system 108 executes the integrated messaging system application 114 and allows each of client systems 102-106 to access its features and functions as described further herein.

Figure 4:
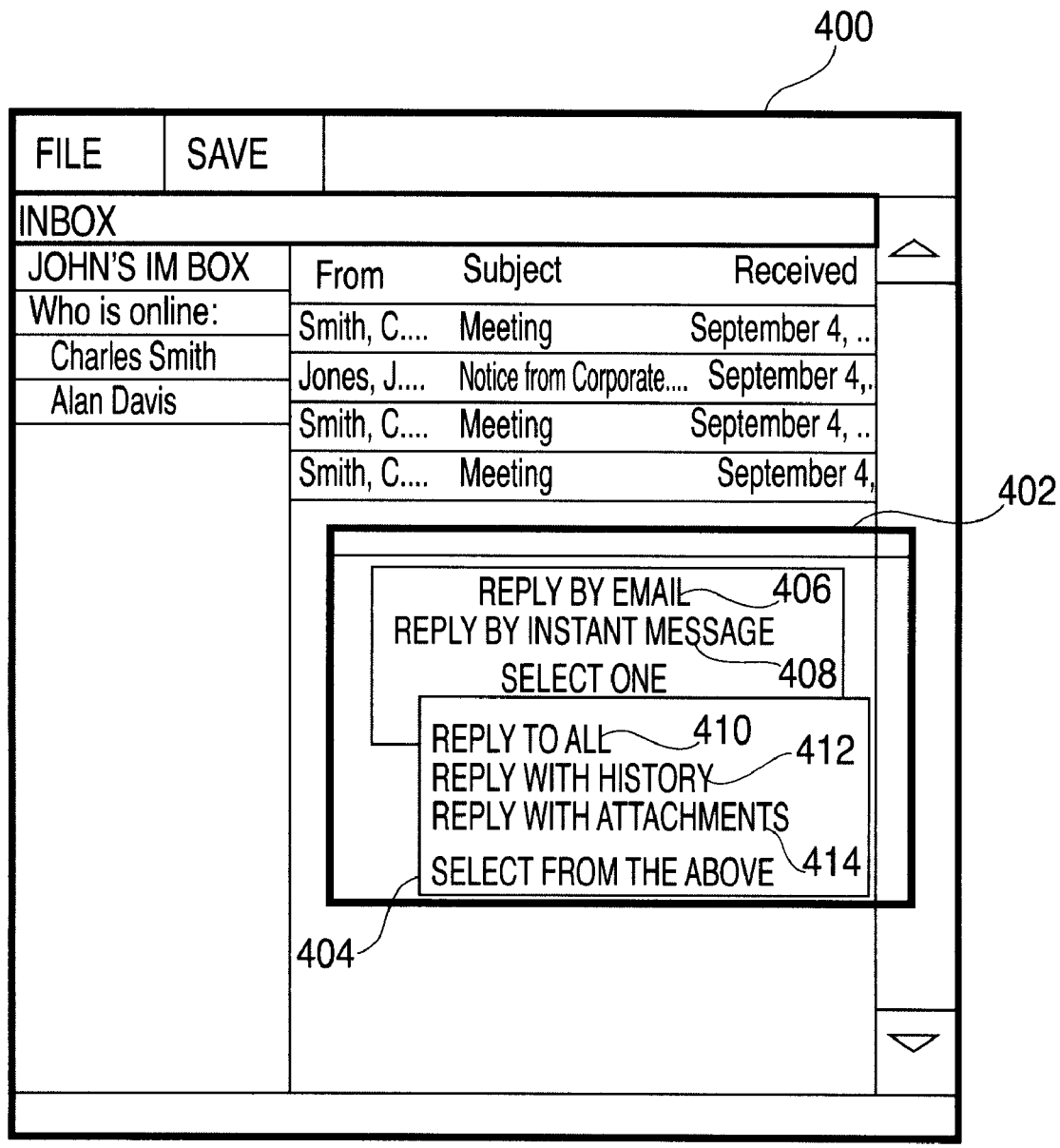
FIG. 4 illustrates a sample computer screen window of an integrated message as seen by a user of the integrated messaging system, in accordance with a further aspect of the invention.

Integrated messaging system 114 further comprises a graphical user interface 116 for enabling a user of computer client systems 102-106 (also referred to herein as email/ instant message senders, email/instant message recipients, and email/instant message responders) to view and compose messages, to access files and data, as well as to enable a user to switch between email applications and instant messaging applications as desired. A sample computer screen 400 of FIG. 4 illustrates the features of the integrated messaging system graphical user interface 116.

Host system 108 comprises a high-powered multiprocessor computer device including web server and applications server software for receiving requests from computer client systems 102-106 to access email and instant messaging services via the Internet or other network. For example, host system 108 may be operated by an electronic utilities (e-utilities) business that outsources computing resources such as applications, such as the integrated messaging system application.

The integrated messaging system may be executed as a standalone application that is installed or downloaded on computer client systems 102-106 or may be incorporated into an existing messaging application or similar cornmercially-available product as an enhancement feature. Further, as indicated above, the features of the integrated messaging system 114 may be provided via a third party application service provider (ASP) or e-utilities broker where service is provided for a per-use fee. These and other embodiments are described further in FIGS. 5-8.

Figure 2:
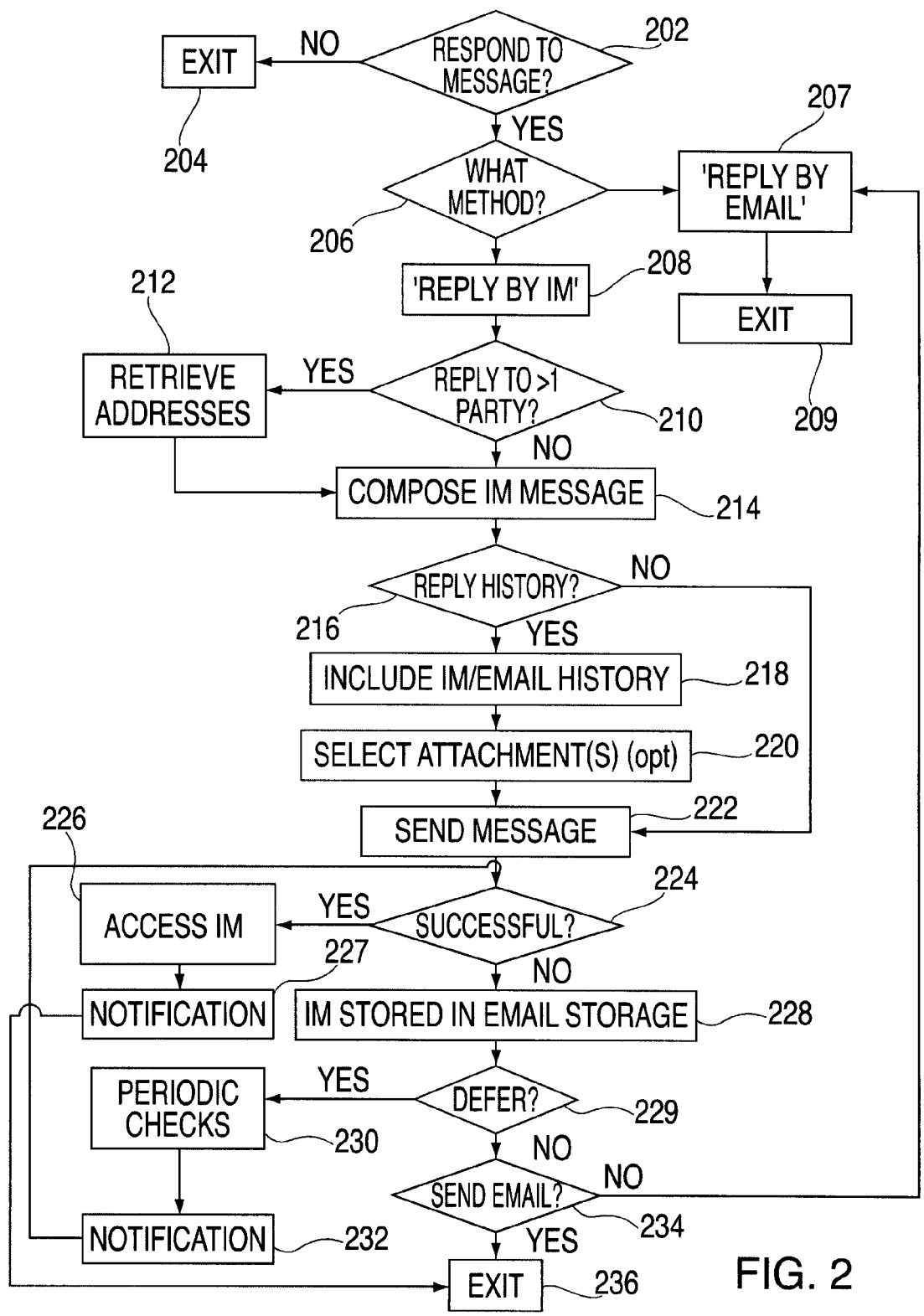
FIG. 2 is a flowchart describing a process of responding to an email via the integrated messaging system in accordance with a further aspect of the invention.

FIG. 2 is a flowchart describing the process of implementing the integrated messaging system in a preferred embodiment. It is assumed for purposes of illustration, that an email recipient on client system 102 has accessed email application 110a and acknowledges receipt of a new email message. The graphical user of interface 116 of integrated messaging system 114 queries the email recipient to determine whether the recipient wishes to respond to the email message at step 202. If not, the process ends at step 204. Otherwise, the process proceeds to step 206 whereby the integrated messaging system 114 requests that the email recipient select a method of response 406, 408 at step 206 as shown in FIG. 4. The email recipient may select "reply by instant message" 408 or "reply by email" 406. The email recipient is also referred to herein as email responder at the time when the email recipient initiates a reply to a message. This distinction is made for clarification purposes only in order to facilitate the description of the process steps herein. If the email responder selects "reply by email" 406, the email application on client system 102 is implemented to allow the responder to compose and send an email as typically performed with traditional email systems and the process ends at step 209.

However, if the responder selects "reply by instant messaging" 408 at step 208, the integrated messaging system checks to see if the responder further wishes to reply to more than one party 410 at step 210. This query is initiated where the original email message indicates that more than one individual received the same email. If the responder so indicates, the integrated messaging system retrieves the recipient addresses for each of the individuals in the original email at step 212. This may be performed by mapping the email addresses of the sending parties to the corresponding instant message addresses located in the responder's storage system. Once the multiple party addresses have been retrieved at step 212, or alternatively, if the responder wishes to respond to only one party at step 210, the integrated messaging system prompts the responder to compose a message at step 214. The responder is queried whether the reply should include history data 412 at step 216. The exchanges that occur between messaging system users (i.e., senders and recipients) may be stored in the participants' email systems if desired. These exchanges are referred to as history data. If the responder selects "reply with history" 412, the integrated messaging system includes the history data in the email at step 218. The integrated messaging system prompts the responder to select attachments 414 as part of the history data that will be sent to the original sender(s) if desired at step 220. The responder submits the message to be sent at step 222. At step 224 it is determined whether the original sender of the instant message is available to receive the message (e.g., logged into the instant message application and has not otherwise blocked the responder or set up an "away message") at step 224. If the original sender is available at step 224, the instant message is accessed by the sender at step 226 and a notification that the message has been received is sent to the responder of the message at step 227. If the sender is not available at step 224, the integrated messaging system queries the responder to determine whether he or she would like to defer the message at step 228. If so, the integrated messaging system periodically retransmits the message to the original sender at step 230 and notifies the responder of this retransmission at step 232. The integrated messaging system stores the instant message along with its history (e.g., attachments, reply parties, and original email message) in the parties' email storage for this purpose. The process returns to step 224 to determine whether the original sender is available. The responder is again queried to see if the message should be deferred at step 228. If the responder decides not to defer, or otherwise, discontinues deferral at step 224, the integrated messaging system gives the responder the option to send the message by email instead at step 234. The responder may either abort the message and exit at step 236 or switch to the email system at step 207. If the responder wishes to reply by email, the integrated messaging system transfers the content of the instant message over to the email application along with the parties' addresses and history data.

Figure 3:
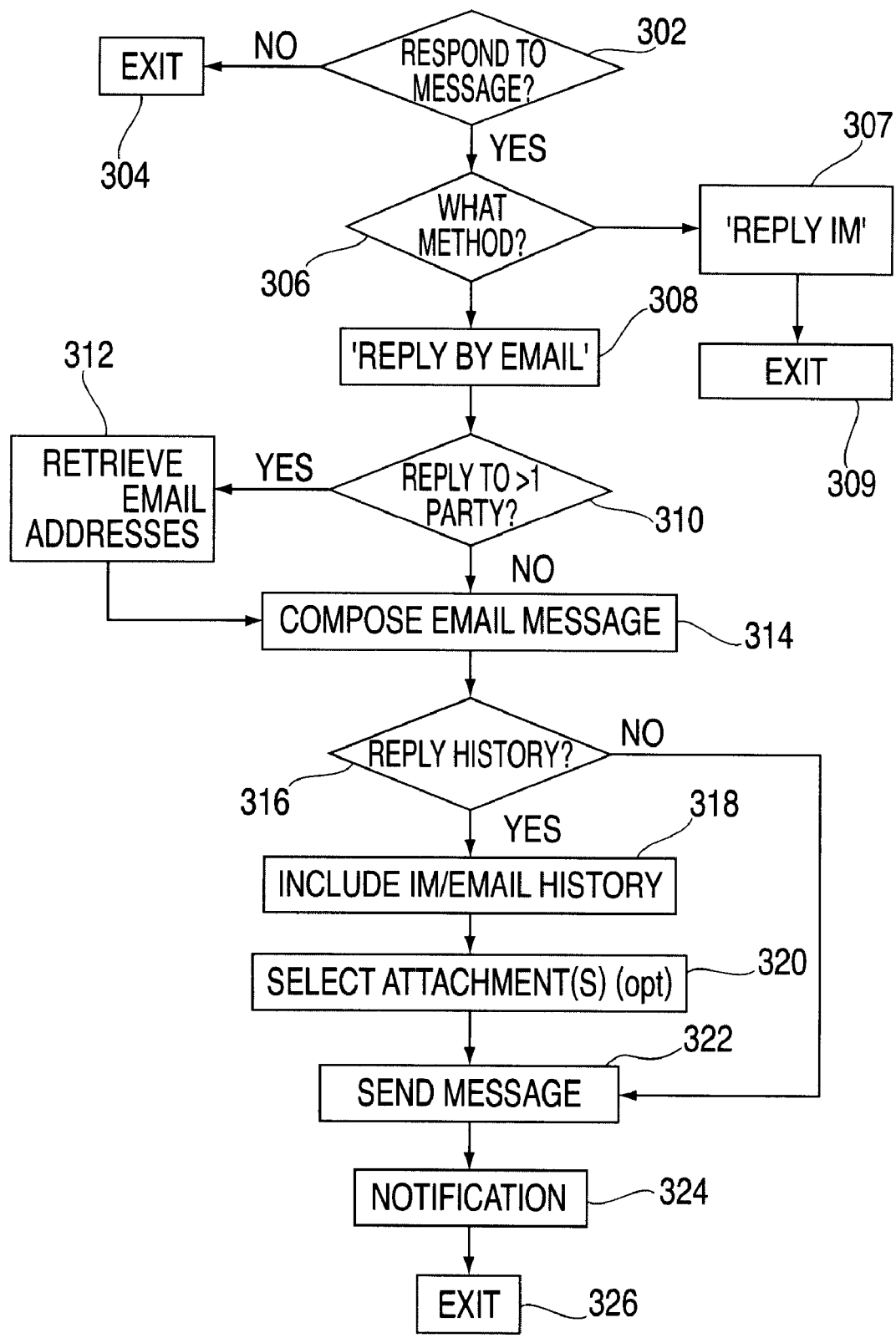
FIG. 3 is a flowchart describing a process of responding to an instant message via the integrated messaging system in accordance with a further aspect of the invention.

As indicated above with respect to FIG. 2, a responder may reply to an email by using an instant messaging application via the integrated messaging system of the invention. FIG. 3 describes a process whereby a recipient of an instant message replies using an email application.

It is assumed for purposes of illustration, that an email user on client system 102 has accessed instant messaging application 112a and acknowledges receipt of a new instant message. The graphical user interface 116 of integrated messaging system 114 queries the instant message recipient to determine whether he or she wishes to respond to the instant message at step 302. If not, the process ends at step 304. Otherwise, the process proceeds to step 306 whereby the integrated messaging system 114 requests that the recipient select a method of response 406, 408 at step 306 as shown in FIG. 4. The instant message recipient is also referred to herein as instant message responder at the time when the instant message recipient initiates a reply to a message. As indicated above with respect to FIG. 2, this distinction is made for clarification purposes. The responder may select "reply by instant message" 408 or "reply by email" 406. If the responder selects "reply by instant message" 408 at step 307, the instant message application on client system 102 is implemented to allow the responder to compose and send an instant message as typically performed with traditional instant messaging systems and the process ends at step 309.

However, if the responder selects "reply by email" 406 at step 308, the integrated messaging system checks to see if the responder further wishes to reply to more than one party 410 at step 310. This query is initiated where the original instant message indicates that more than one individual received the same message. If the responder so indicates, the integrated messaging system retrieves the addresses for each of the individuals in the original instant message at step 312. Once the multiple party addresses have been retrieved at step 312, or alternatively, if the responder wishes to reply to only one party at step 310, the integrated messaging system prompts the responder to compose an email message at step 314. The responder is queried whether the reply should include history data 412 at step 316. The exchanges that occur between messaging system users (i.e., recipients and senders) may be stored in the participants' email systems if desired. If the responder selects "reply with history" 412, the integrated messaging system includes the history data in the instant message at step 318. The integrated messaging system prompts the responder to select attachments 414 as part of the history data that will be sent to the instant message sender(s) if desired at step 320. The responder submits the message to be sent at step 322. The integrated messaging system is not required to check for availability of the original sender as described in FIG. 3, as the email message is simply stored in the email sender's inbox. A notification that the message has been transmitted is sent to the responder of the message at step 324 and the process exits at step 326. In a preferred embodiment, either of the messaging system users may choose to use an instant message system to handle discussions that have occurred through the email system. Conversely, either of the messaging system users may choose to use an email system to handle discussions that have occurred through an instant messaging application.

In an alternate embodiment, the instant messaging system is used along with the email system to quickly browse through responses on an email message. Once the original email message is opened, the integrated messaging system prompts the user with responses on this email message through pop-up boxes, also enabling the user to directly respond to the originator of the comment on the email message. This response is sent either through email or the instant messaging system.

By using an instant message system instead of an email system for exchanging small message, the history of the conversation is kept on both sides, without the network having to send this history to the participants, resulting in less network load. Also, the added message by the participants is clearly distinguished from the historical content, enabling fast conversation and making obsolete the need to go through the original notes to seek changes made.

The integrated messaging system of the present invention may, as previously described reside on a stand-alone computer system which may have access to the Internet, or may reside on a computer system which is part of the network through which there is Internet access. With a connection to a network and/or the Internet, there are several different ways in which the process software used to implement the systems and methods of the present invention may be integrated with the network, and deployed using a local network, a remote network, an e-mail system, and/or a virtual private network. The following descriptions review the various ways of accomplishing these activities.

Integration of integrated messaging software: To implement the integrated messaging systems and methods of the present invention, process software, which is composed of the software as described above and related components including any needed data structures, is written and then if desired, integrated into a client, server and network environment. This integration is accomplished by taking those steps needed to enable the process software to coexist withother application, operating system and network operating system software and then installing the process software on the clients and servers in the environment where the process software will function.

Figure 5A:
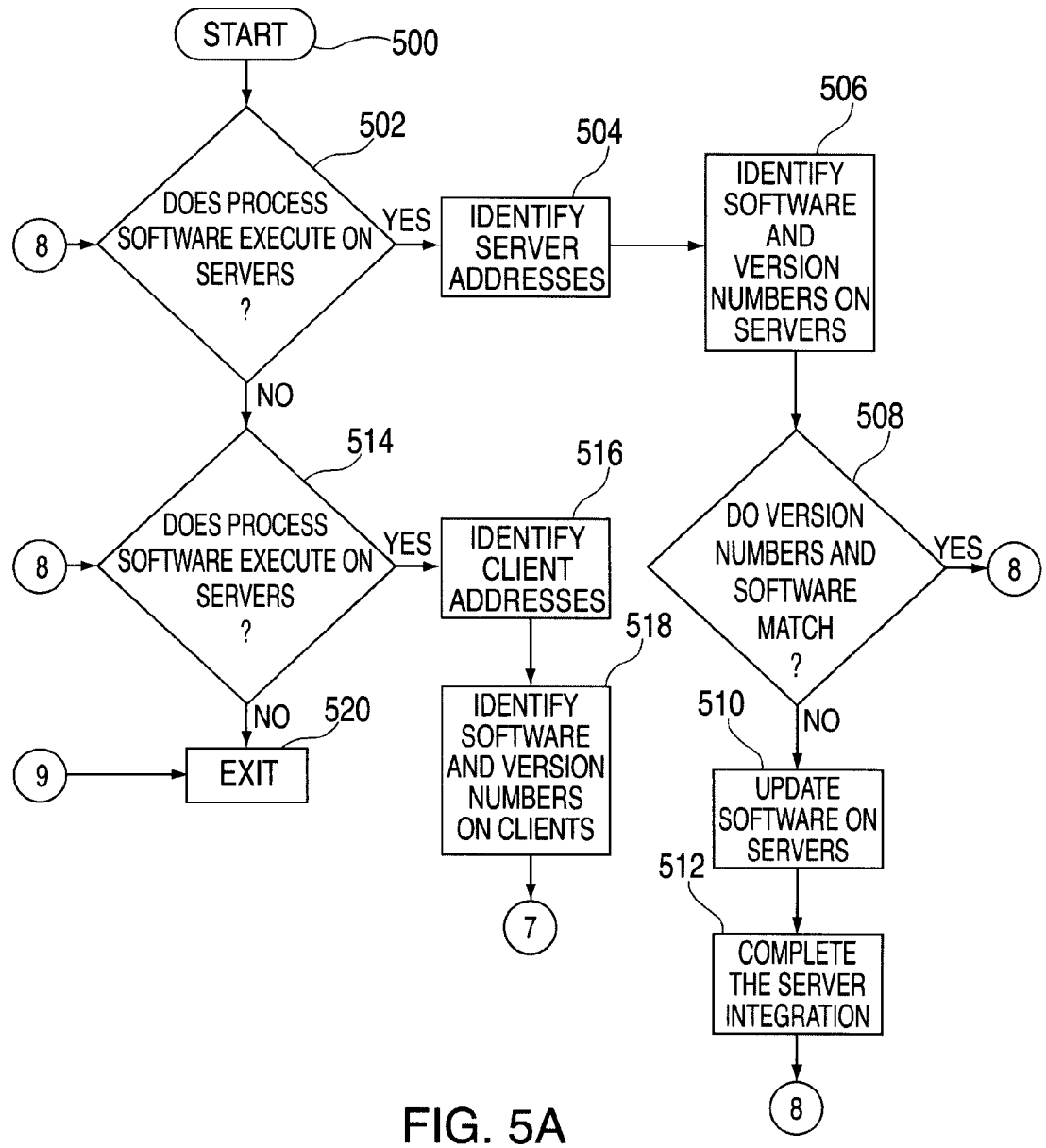
FIGS. 5A and 5B are flowcharts illustrating how the process software implementing the systems and methods of the invention may be integrated into client, server, and network environments.
Figure 5B:
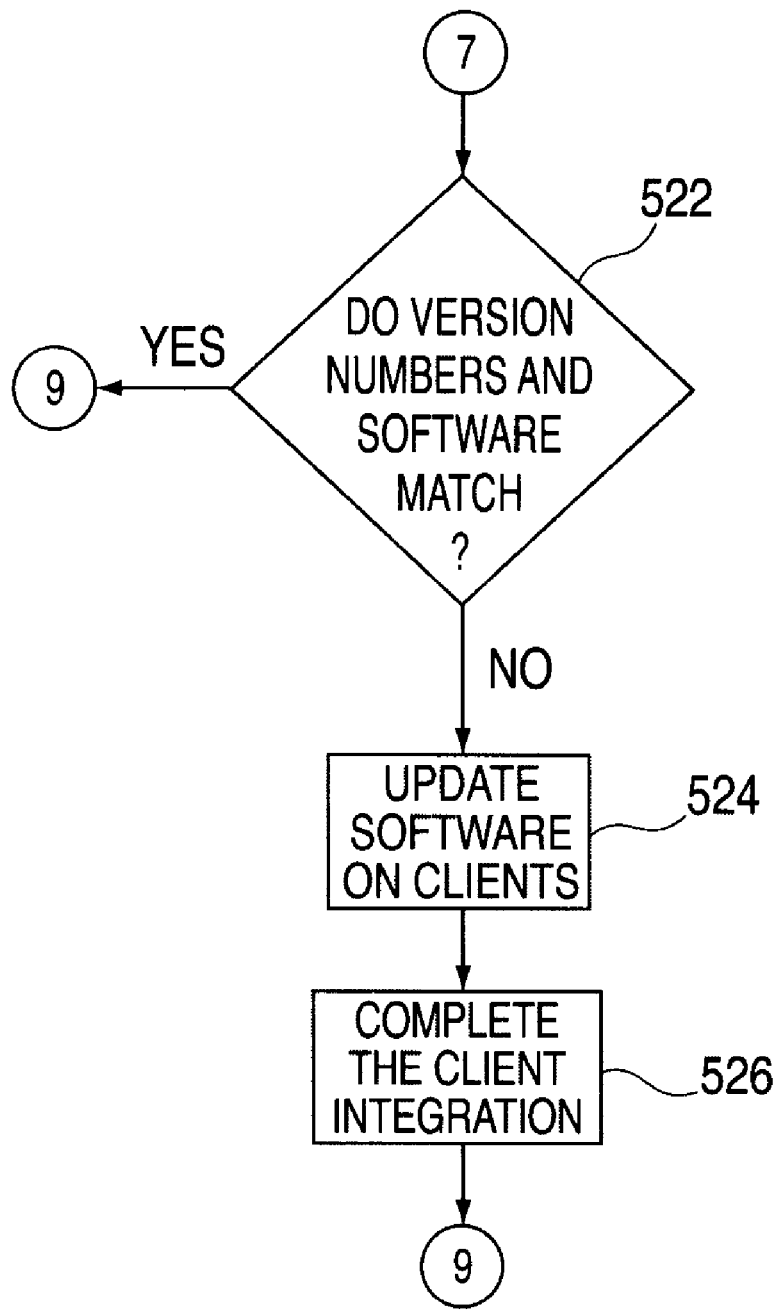

An overview of this integration activity will now be provided, followed by a more detailed description of same with reference to the flowcharts of FIGS. 5A and 5B.

The first step in the integration activity is to identify any software on the clients and servers where the process software will be deployed that are required by the process software or that need to work in conjunction with the process software. This includes the network operating system, which is the software that enhances a basic operating system by adding networking features.

Next, the software applications and version numbers are identified and compared to the list of software applications and version numbers that have been tested to work with the process software. Those software applications that are missing or that do not match the correct version are upgraded with the correct version numbers. Program instructions that pass parameters from the process software to the software applications will be checked to ensure the parameter lists matches the parameter lists required by the process software. Conversely, parameters passed by the software applications to the process software will be checked to ensure the parameters match the parameters required by the process software. The client and server operating systems, including the network operating systems, are identified and compared to the list of operating systems, version numbers and network software that have been tested to work with the process software. Those operating systems, version numbers, and network software that do not match the list of tested operating systems and version numbers are then upgraded on the clients and servers to the required level.

After ensuring that the software resident on the computer systems where the process software is to be deployed is at the correct version level(s); that is, has been tested to work with the process software, the integration is completed. This is done by installing the process software on the clients and servers. Armed with the foregoing overview of the integration activity, the following detailed description of same should be readily understood.

Referring to FIGS. 5A and 5B, step 500 begins the integration of the process software for implementing the integrated messaging systems and methods of the present invention. It is determined whether there are any process software programs that will execute on a server or servers at step 502. If this is not the case, then integration proceeds to determine if the process software will execute on clients at step 514. If this is the case, then the server addresses are identified at step 504. The servers are checked to see if they contain software that includes the operating system (OS), applications, and network operating systems (NOS), together with their version numbers, that have been tested with the process software at step 506. The servers are also checked to determine if there is any missing software that is required by the process software as part of the activity at step 506. A determination is made if the version numbers match the version numbers of OS, applications and NOS that have been tested with the process software at step 508. If all of the versions match, and there is no missing required software, the integration continues at step 514. If one or more of the version numbers do not match, then the unmatched versions are updated on the server or servers with the correct versions at step 510. Additionally, if there is missing required software, then it is updated on the server or servers at step 510. The server integration is completed by installing the process software at step 512.

Step 514, which follows either of steps 502, 508 or 512, determines if there are any programs of the process software that will execute on the clients. If no process software programs execute on the clients, the integration proceeds to step 520 and exits. If this not the case, then the client addresses are identified at step 516.

At step 518, the clients are checked to see if they contain software that includes the operating system (OS), applications, and network operating systems (NOS) software, together with their version numbers, that have been tested with the process software. The clients are also checked at step 518 to determine if there is any missing software that is required by the process software.

At step 522, a determination is made if the version numbers match the version numbers of OS, application, and NOS that have been tested with the process software. If all of the versions match, and there is no missing required software, then the integration proceeds to step 520 and exits.

If one or more of the version numbers do not match, then the unmatched versions are updated on the clients with the correct versions at step 524. In addition, if there is missing required software, then the required software is updated on the clients as part of step 524. The client integration is completed by installing the process software on the clients at step 526. The integration proceeds to step 520 and exits.

Deployment of integrated messaging system software: It should be well understood that the process software for implementing the integrated messaging system of the present invention may be deployed by manually loading the process software directly into the client, server and proxy computers from a suitable storage medium such as a CD, DVD, etc. It is useful to provide an overview of still other ways in which the process software may also be automatically or semi-automatically deployed into one or more computer systems. The process software may be deployed by sending or loading the process software to a central server or a group of central servers. From there, the process software may then be downloaded into the client computers that will execute the process software. Alternatively, the process software may be sent directly to the client system via e-mail. The process software is then either detached to a directory or loaded into a directory by a button on the e-mail that executes a program that detaches the process software attached to the e-mail into a directory. Another alternative is to send the process software directly to a directory on the hard drive of a client computer. Also, when there are proxy servers, the automatic or self-automatic deployment process will select the proxy server code, determine on which computers to place the proxy servers' code, transmit the proxy server code, and then install the proxy server code on the proxy computer. The process software will be transmitted to the proxy server and stored on the proxy server. Armed with this overview of the possible deployment processes, the following detailed description of same with reference to FIGS. 6A and 6B, where the deployment processes are illustrated, will be more easily understood.

Step 600 begins the deployment of the process software. It is determined whether there are any programs that will reside on a server or servers when the process software is executed at step 602. If the answer is "yes", then the servers that will contain the executables are identified, as indicated in step 636 of FIG. 6B. The process software for the server or servers is transferred directly to the servers' storage via FTP or some other protocol or by copying though the use of a shared file system at step 638. The process software is then installed on the servers as indicated at step 640.

Figure 6A:
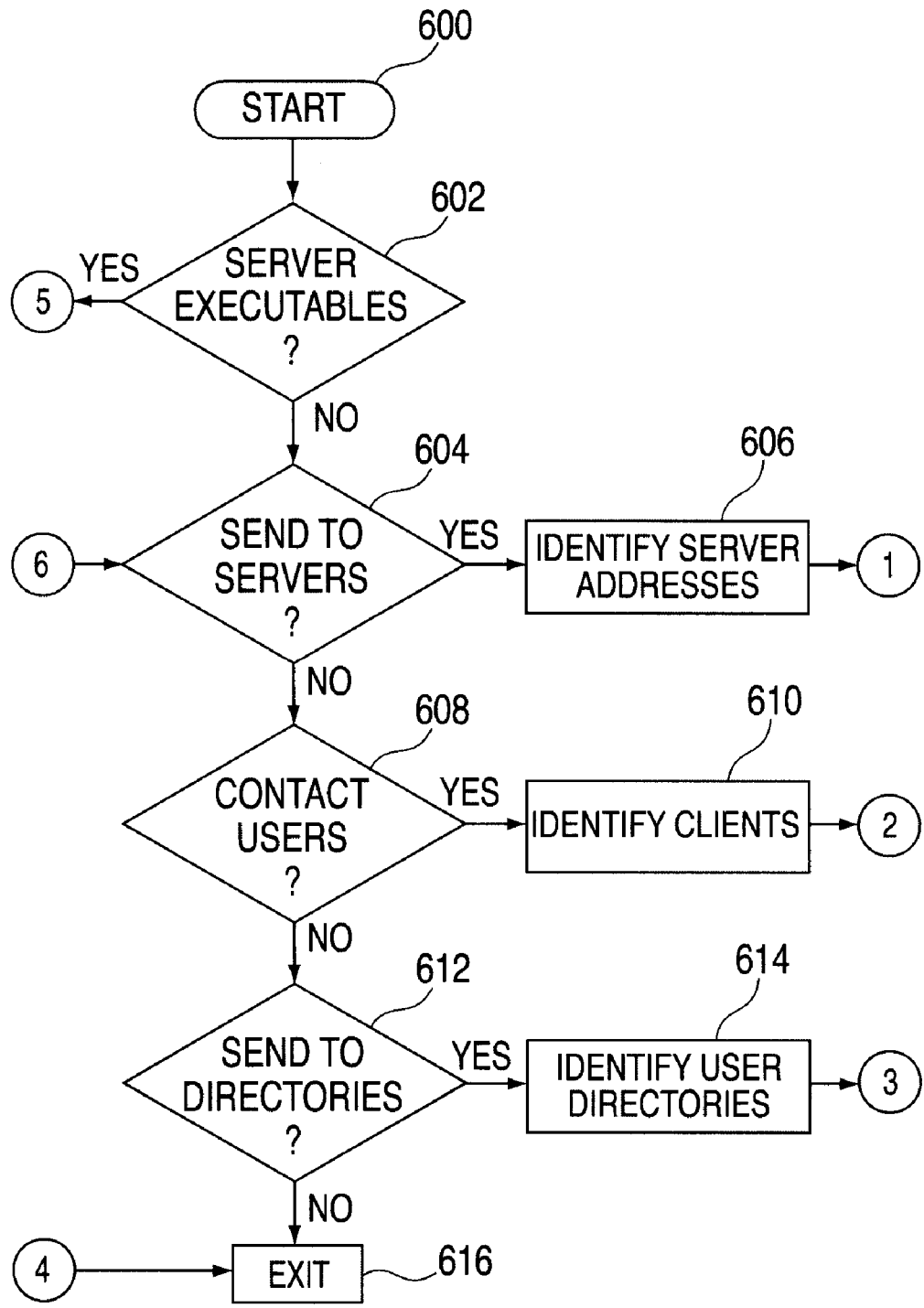
FIGS. 6A and 6B are flowcharts illustrating various ways in which the process software of the invention may be semi-automatically or automatically deployed across various networks and onto server, client (user), and proxy computers.
Figure 6B:
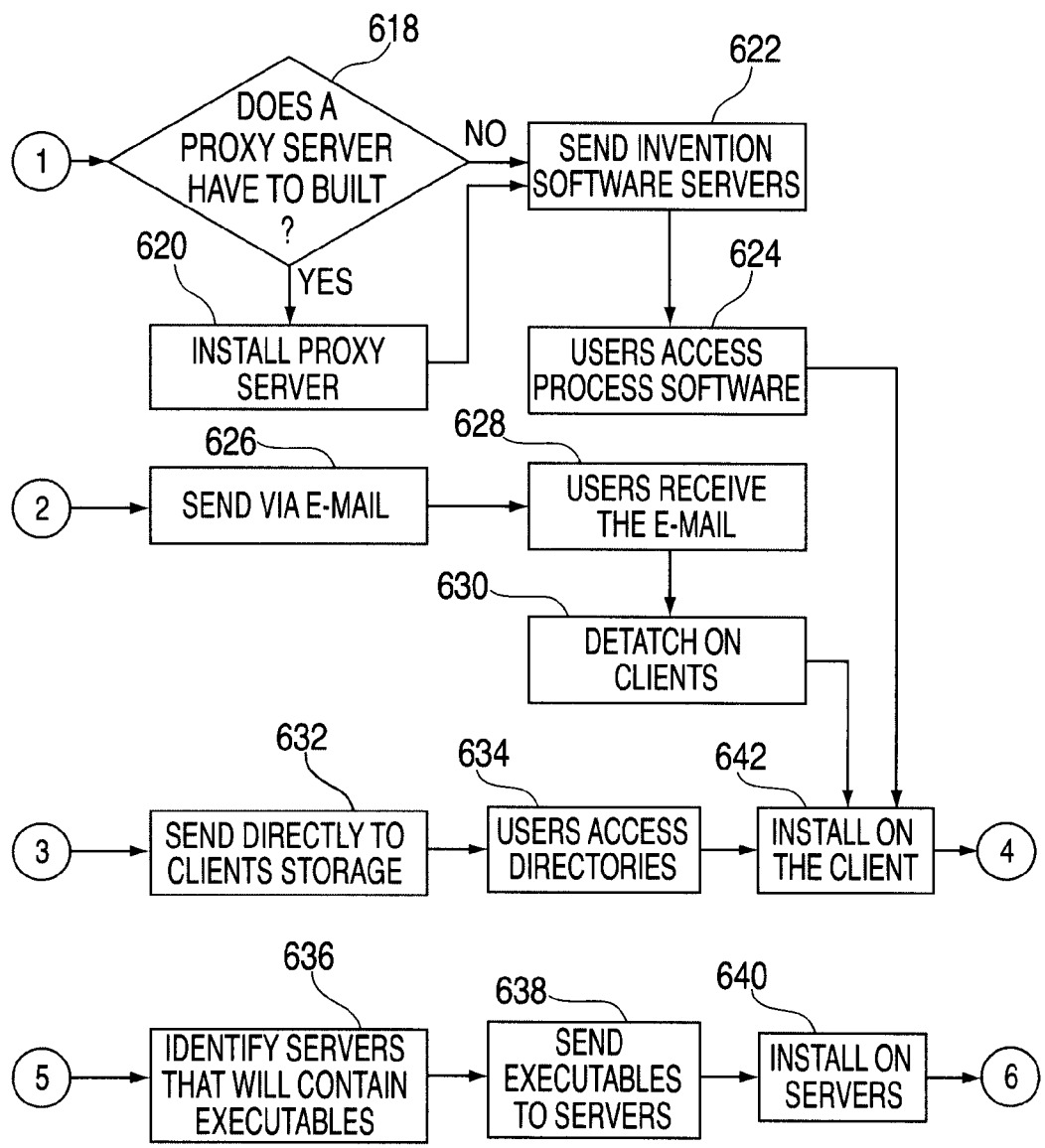

Next, as shown in step 604 of FIG. 6A, a determination is made of whether the process software is to be deployed by having users access the process software on a server or servers. If the users are to access the process software on servers, then the server addresses that will store the process software are identified at step 606.

Next, as shown at step 618, a determination is made if a proxy server is to be built to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed as indicated at step 620. Next, the process software for implementing the present invention is sent to the servers, as indicated in step 622 either via a protocol such as FTP or it is copied directly from the source files to the server files via file sharing. Another way of sending the process software to the servers is to send a transaction to the servers that contain the process software and have the server process the transaction. In this manner, the process software may be received by and copied into the server's file system. Once the process software is stored at the servers, the users via their client computers then access the process software on the servers and copy it into to the file systems of their client computers at step 624. Another alternative is to have the servers automatically copy the process software to each client and then run the installation program for the process software at each client computer. Either way, the user computer executes or causes to be executed the program that installs the process software on the client computer at step 642 and the process exits at step 616.

Continuing now at step 608 in FIG. 6A, a determination is made as to whether the process software is to be deployed by sending the process software to users via e-mail. If the answer is yes, then, as indicated at step 610, the set of users where the process software will be deployed are identified together with the addresses of the user client computers. The process software is sent via email in step 626 (shown in FIG. 6B) to each of the users' client computers. Then, as indicated in step 628, the users receive the e-mail and detach the process software from the e-mail to a directory on their client computers at step 630. The user then executes the program that installs the process software on his client computer at step 642 and exits the process at step 616.

Continuing at step 612 (see bottom of FIG. 6A), a determination is made of whether the process software will be sent directly to user directories on their client computers. If so, the user directories are identified at step 614. Then, the process software is transferred directly to the identified directory on the user's client computer, as indicated in step 632. This can be done in several ways such as, but not limited to, sharing the file system directories and copying from the sender's file system to the recipient user's file system or, alternatively, using a transfer protocol such as File Transfer Protocol (FTP). Next, the users access the directories on their client file systems, as indicated in step 634, in preparation for installing the process software. Finally, the user executes the program that installs the process software on his client computer at step 642 and then exits the process at step 616.

Use of Virtual Private Networks for integrated messaging system software: The process software may be deployed, accessed, and executed through the use of a virtual private network (VPN). A VPN is any combination of technologies that can be used to secure a connection through an otherwise unsecured or untrusted network. VPNs are used to improve security and can often also reduce operational costs. The VPN makes use of a public network, usually the Internet, to connect remote sites or users together. Instead of using a dedicated, real-world connections such as leased line, the VPN uses "virtual" connections routed through the Internet from the company's private network to the remote site or employee (s). Access to the software via a VPN can be provided as a service by specifically constructing the VPN for purposes of delivery or execution of the process software (i.e., the software resides elsewhere). In such an instance, the lifetime of the VPN is often limited to a given period of time or to a given number of deployments based on an amount paid.

The process software may be deployed, accessed and executed through either a remote-access VPN or a site-to-site VPN. When using a remote-access VPN, the process software is typically deployed, accessed, and executed via the secure, encrypted connections between a company's private network and remote users through a third-party service provider. The enterprise service provider (ESP) sets up and/or authorizes access to a network access server (NAS) and provides the remote users with desktop client software for their computers. The telecommuters may then dial a phone number (e.g., a toll-free number) or attach directly via a cable, DSL, or wireless modem to reach the NAS and use their VPN client software to access the corporate network and to access, download, and execute the process software.

When using a site-to-site VPN, the process software is typically deployed, accessed, and executed through the use of dedicated equipment and large-scale encryption. These tools are often used to connect multiple fixed sites of a larger company over a public network such as the Internet.

The process software is transported over the VPN via a process called tunneling. Tunneling is a process involving the placement of an entire packet within another packet and sending it over a network. The protocol of the outer packet is understood by the network and by both points, called tunnel interfaces, where the packet enters and exits the network. Tunneling generally encapsulates the private network data and protocol information within the public network transmissions so that the private network protocol information appears to the public network simply as unintelligible data. Armed with the foregoing overview of virtual private networks and how they operate and how they may be used to transport the process software, the following more detailed description of same with reference to the flowcharts of FIGS. 7A-7C should be more readily understood.

Figure 7A:
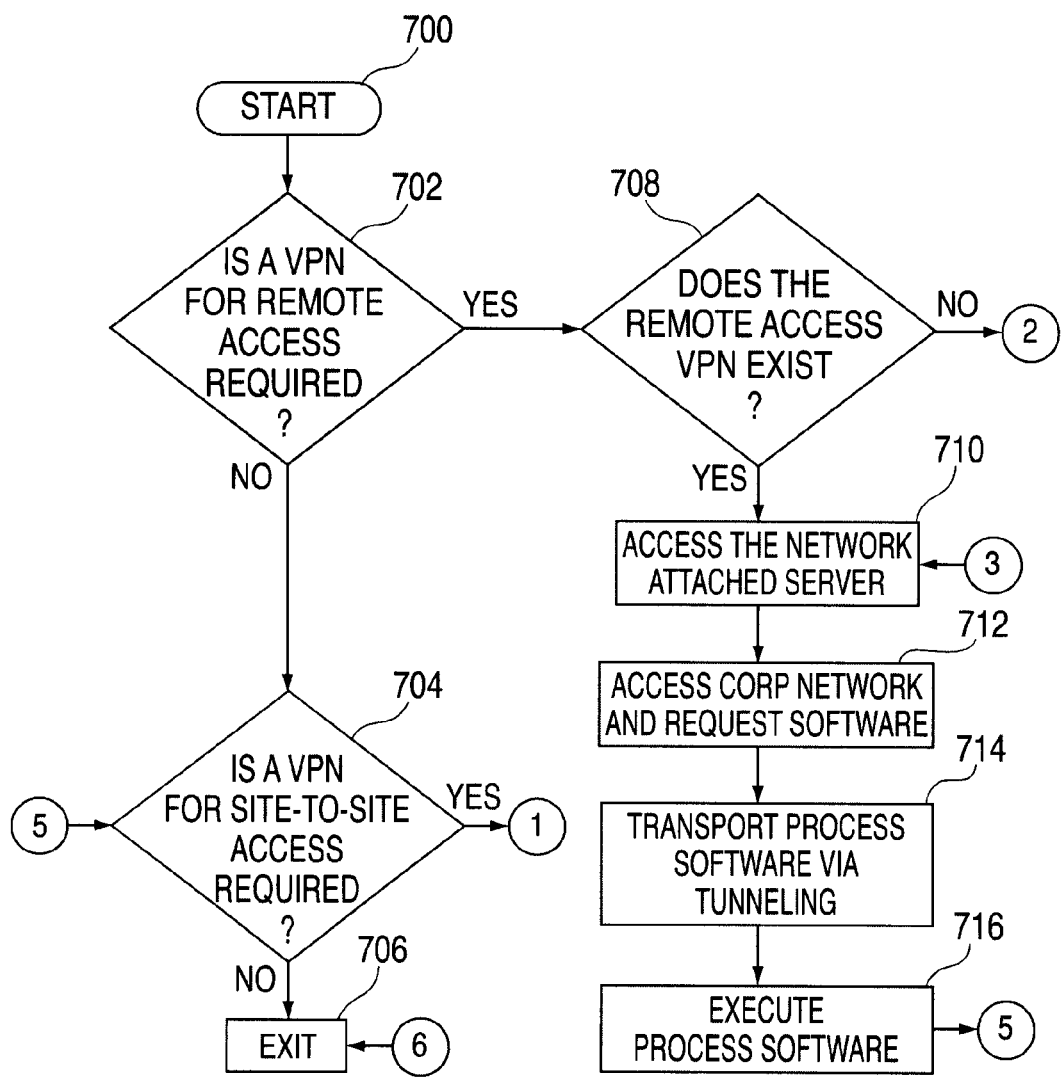
FIGS. 7A through 7C are flowcharts illustrating how process software for implementing the systems and methods of the invention are deployed through the installation and use of two different forms of a virtual private network (VPN)
Figure 7B:
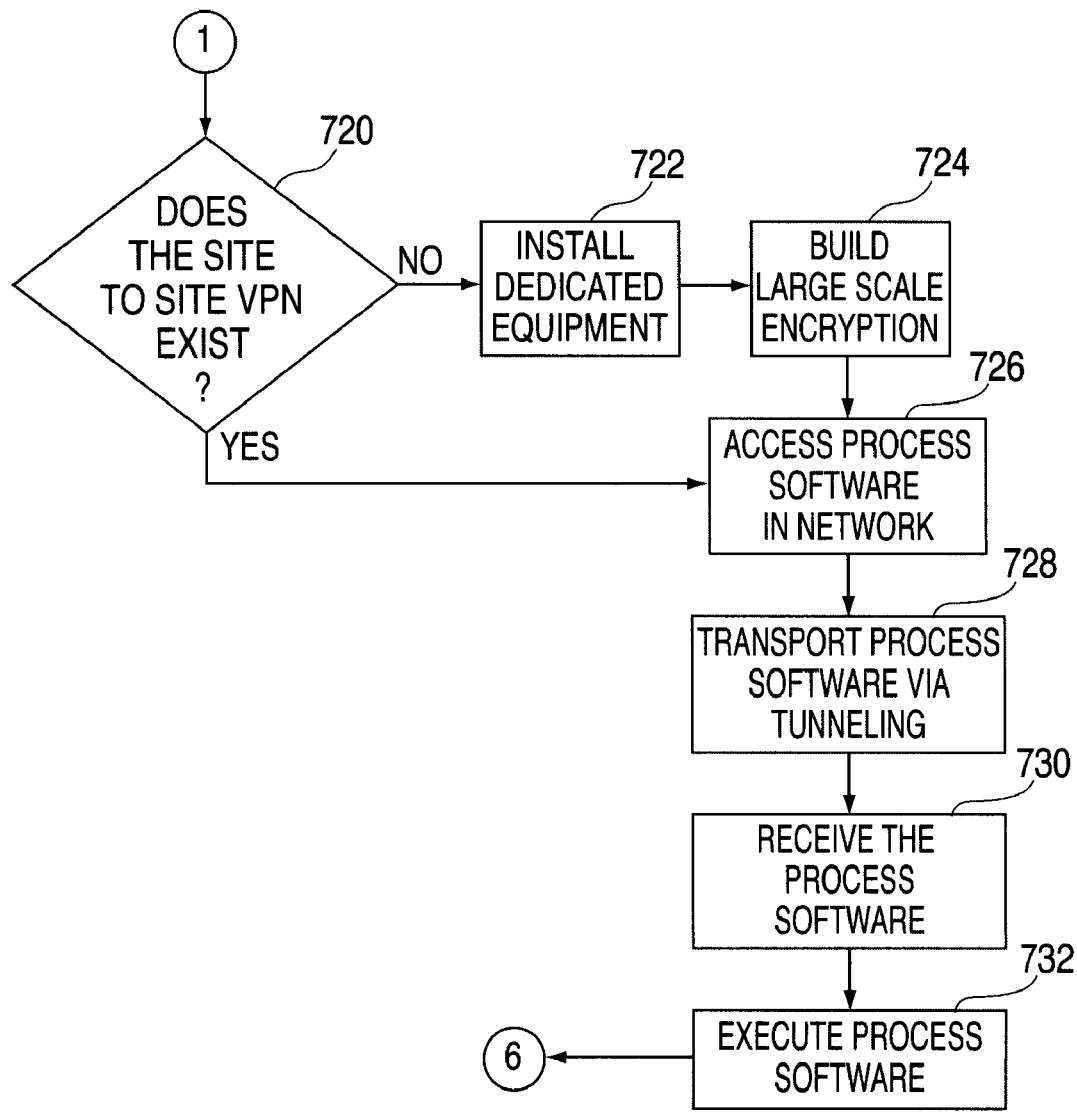
Figure 7C:
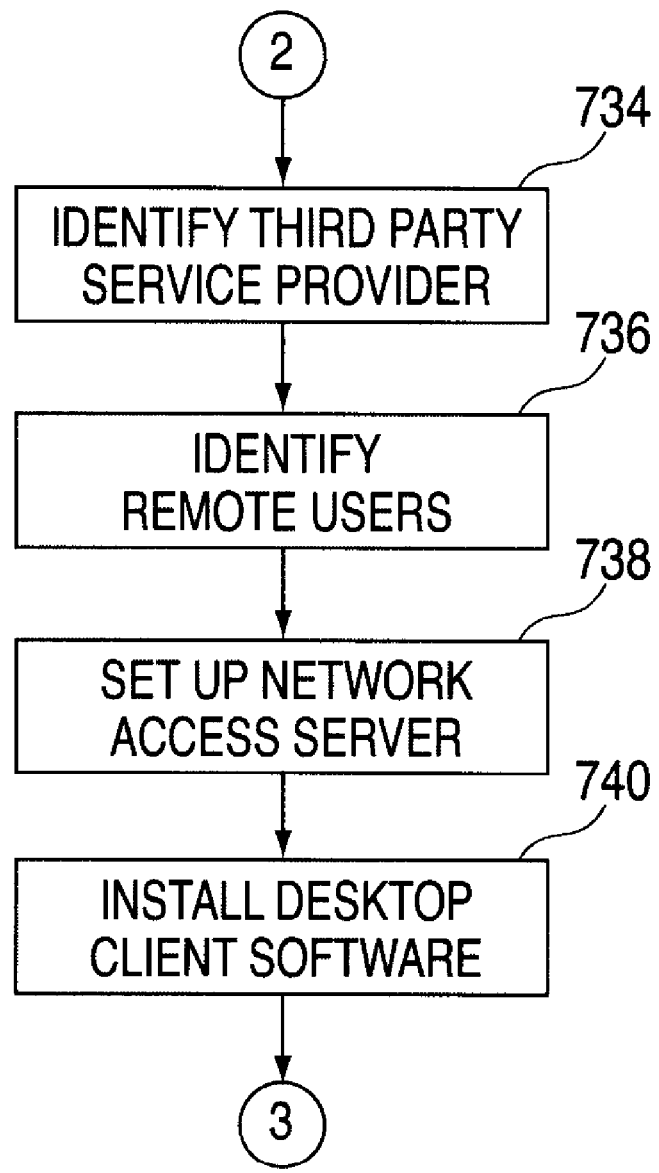
Figure 8A:
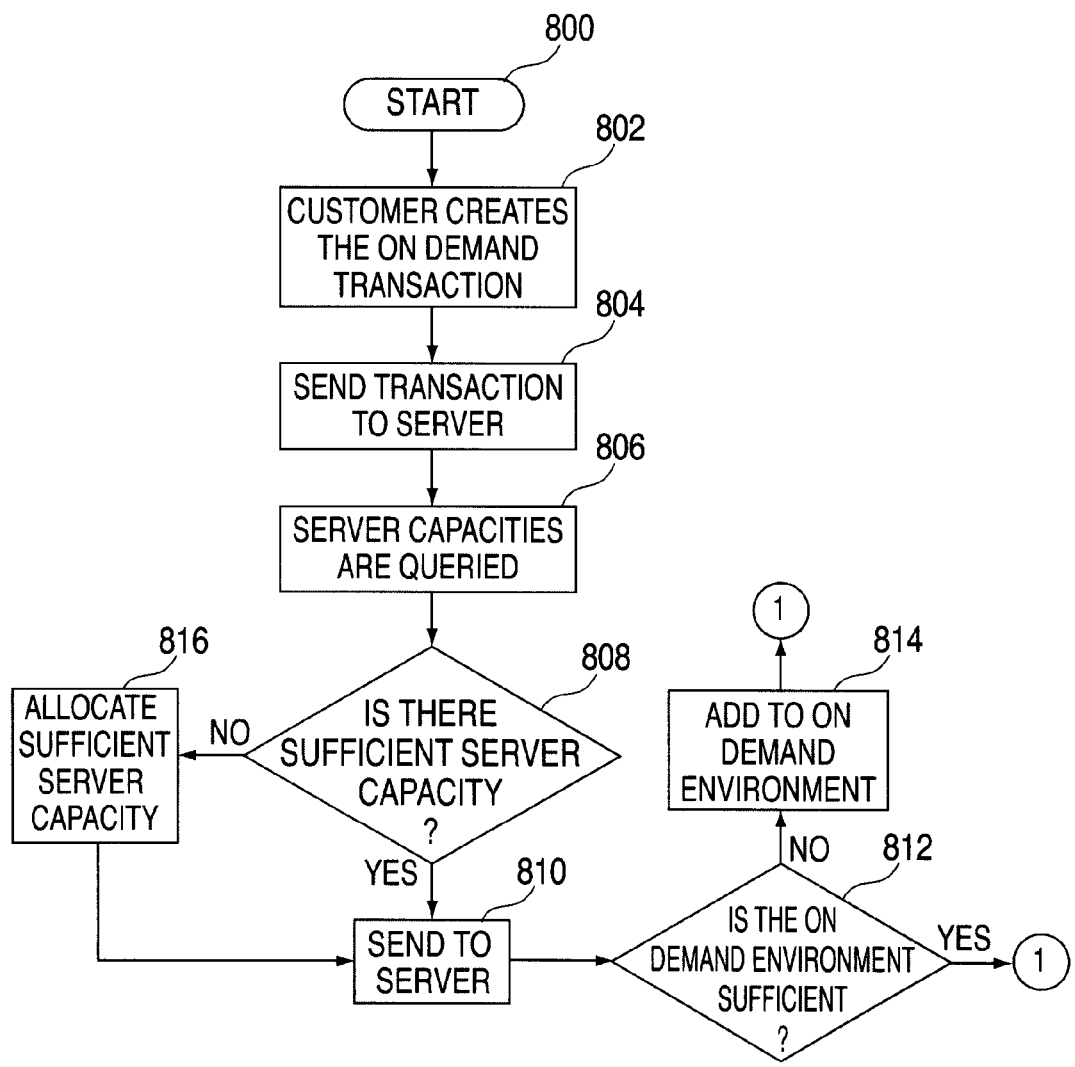
FIGS. 8A and 8B are flowcharts illustrating how the process software for implementing the systems and methods of the invention can be deployed through an On Demand business model, which allows the process software to be shared and simultaneously service multiple customers in a flexible, automated fashion under a pay-for-what-you-use plan.
Figure 8B:
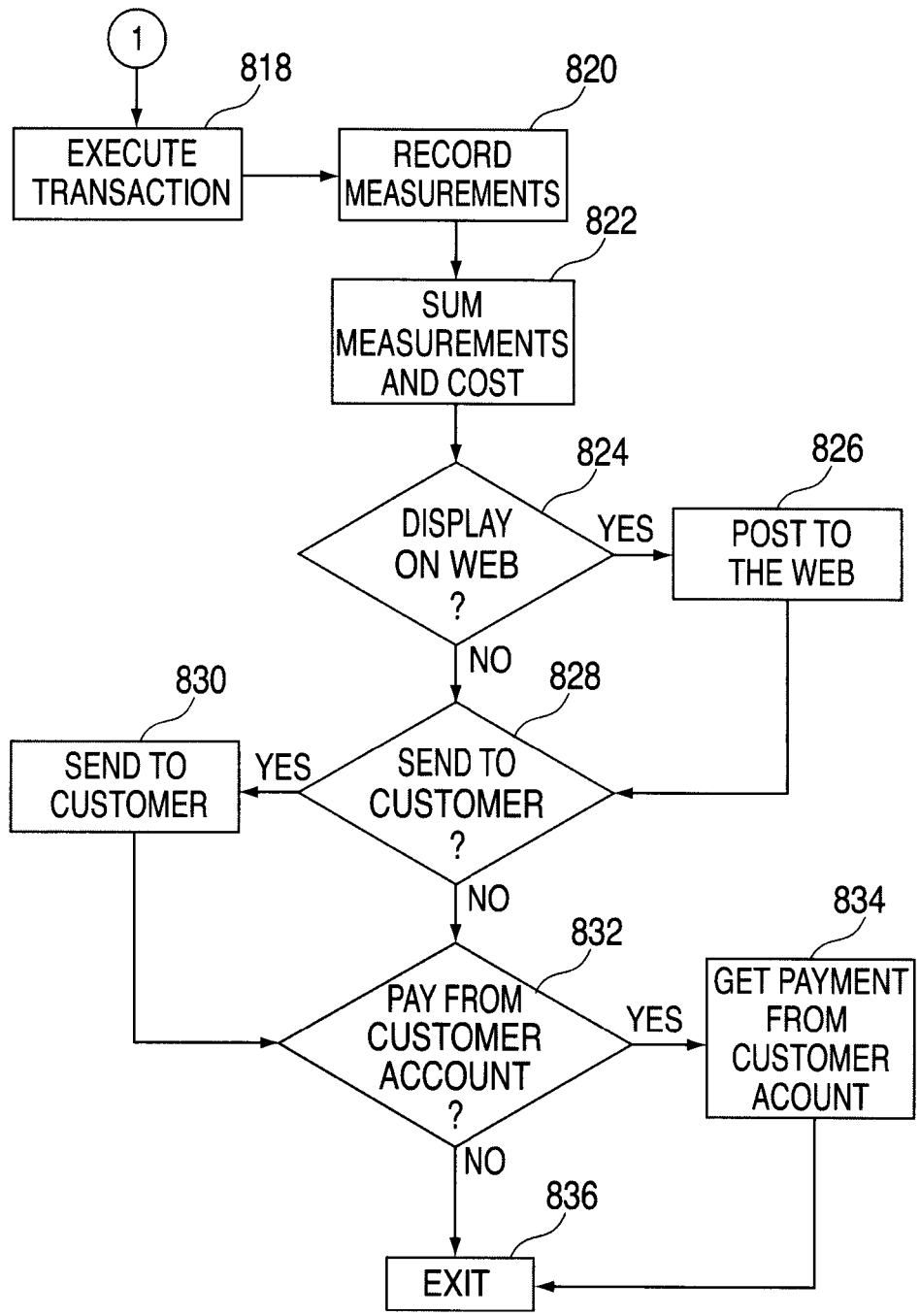

Step 700 in FIG. 7A begins the virtual private network (VPN) process. A determination is made at step 702 to see if a VPN for remote access is required. If it is not required, then flow proceeds to step 704. If it is required, then flow proceeds to step 708 where a determination is made if as to whether a remote access VPN exists that is available for use.

If a remote access VPN does exist, then flow proceeds to step 710 in FIG. 7A. Otherwise flow proceeds to step 734 (see top of FIG. 7C), where a third party provider that will provide the secure, encrypted connections between the company's private network and the company's remote users is identified. Next, as indicated in step 736, the company's remote users are identified. Then, at step 738, the identified third party provider sets up a network access server (NAS). The NAS allows the remote users to dial a phone number (e.g., a toll free number) or attach directly via a cable, DSL, wireless, or other modem to access, download, and install the desktop client software for the remote-access VPN as indicated at step 740.

Returning to step 710 in FIG. 7A, after the remote access VPN has been built or if it been previously installed, the remote users can then access the process software by dialing into the NAS or attaching directly via a cable, DSL, or other modem into the NAS. This step 710 allows entry into the corporate network, as indicated at step 712, where the process software may be accessed. The process software is transported to the remote user's desktop computer over the network via tunneling. During tunneling, see step 714, the process software is divided into packets and each packet including the data and protocol for that packet, is placed within another packet. When the process software arrives at the remote user's desktop computer, it is removed from the packets, reconstituted, and then may be executed on the remote users desktop, as indicated at step 716.

Returning now to step 704 in FIG. 7A, a determination is made to see if a VPN for site-to-site access is required. If it is not required, then flow proceeds to the exit at step 706. If it is required, flow proceeds to step 720 (see top of FIG. 7B) to determine if the site-to-site VPN exists. If it does exist, then flow proceeds to step 726. If it does not exist, then as indicated at step 722, dedicated equipment required to establish a site-to-site VPN is installed. Then a large-scale encryption is built into the VPN at step 724.

After the site-to-site VPN has been built, or if it had been previously established, the users access the process software via the VPN as indicated in step 726. Next, the process software is transported to the site users over the network via tunneling as indicated in step 728. As previously explained, the process software is divided into packets and each packet including the data and protocol is placed within another packet, as indicated in step 730. When the process software arrives at the remote user's desktop, it is removed from the packets, reconstituted, and executed on the site user's desktop at step 732 and the process proceeds to step 706 and exits.

On Demand Computing for integrated messaging system software: The process software for implementing the integrated messaging system of the present invention may be shared; that is, it may be used to simultaneously serve multiple customers in a flexible, automated fashion. It is process software that is easily standardized, requiring little customization, and is scalable, thus providing capacity on demand in a pay-as-you-go model known as "on demand" computing. An overview of on demand computing as applied to the integrated messaging software will now be provided, followed by a more detailed description of same made with reference to the flowcharts of FIGS. 8A and 8B.

The process software for implementing the present invention can be stored on a shared file system accessible from one or more servers. The process software may be executed via transactions that contain data and server processing requests that use measurable CPU units on the accessed server. CPU units are units of time such as minutes, seconds, and hours on the central processor of the server. Additionally, the accessed server may make requests of other servers that require CPU units. CPU units are an example that represents but one measurement of use. Other measurements of use include but are not limited to network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc., approach a capacity so as to affect performance, additional network bandwidth, memory usage, storage etc. are added as needed to share the workload.

The measurements of use used for each service and customers are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer who then remits payment to the service provider.

In another embodiment, the service provider requests payment directly from a customer account at a banking or financial institution. In yet another embodiment, if the service provider is also a customer of the customer that uses the process software application, the payment owed to the service provider is reconciled to the payment owed by the service provider to minimize the transfer of payments. Armed with the foregoing overview, the detailed description of the on demand computing with respect to the process software, the following detailed description of same with reference to FIGS. 8A and 8B where the on demand processes are illustrated, will be more easily understood.

Step 800 begins the On Demand process. A transaction is created that contains the unique customer identification, the requested service type and any service parameters that further specify the type of service as indicated in step 802. The transaction is then sent to the main server as shown in step 804. In an On Demand environment, the main server may initially be the only server. As capacity is consumed, other servers are added to the On Demand environment.

The server central processing unit (CPU) capacities in the On Demand environment are queried at step 806. The CPU requirement of the transaction is estimated, then the servers available CPU capacity in the On Demand environment are compared to the transaction CPU requirement to see if there is sufficient CPU available capacity in any server to process the transaction as indicated in step 808. If there is not sufficient server CPU available capacity, then additional server CPU capacity is allocated to process the transaction as indicated in step 816. If there was already sufficient available CPU capacity, the transaction is sent to a selected server at step 810.

Before executing the transaction, a check is made of the remaining On Demand environment to determine if the environment has sufficient available capacity for processing the transaction as indicated at step 812. This environment capacity consists of elements such as, but not limited to, network bandwidth, processor memory, storage, etc. If there is insufficient available capacity, then capacity will be added to the On Demand environment as indicated in step 814. The required software to process the transaction is accessed, loaded into memory, and the transaction is executed as indicated in step 818.

The usage measurements are recorded as indicated in step 820. The usage measurements consist of the portions of those functions in the On Demand environment that are used to process the transaction. The usage of functions such as, but not limited to, network bandwidth, processor memory, storage and CPU cycles are recorded. The usage measurements are summed, multiplied by unit costs, and recorded as a charge to the requesting customer as indicated in step 822.

If the customer has requested that the On Demand costs be posted to a web site as indicated in step 824, then they are posted to a web site at step 826. If the customer has requested that the On Demand costs be sent via e-mail to a customer address as indicated in step 828, then they are sent to the customer via e-mail as indicated in step 830. If the customer has requested that the On Demand costs be paid directly from a customer account at step 832, then payment is received directly from the customer account at step 834. The On Demand process proceeds to step 836 and then exits.

As will be appreciated from the above description, the restrictions and limitations that exist with messaging systems are efficiently overcome. The integrated messaging system of the invention enables users of email and instant messaging systems to work interoperably, allowing them to switch between messaging systems, in order to improve overall communicational efficiency.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for providing interoperability of email and instant messaging services, comprising:

in response to receiving a request by an email recipient to respond to an email message using an instant message application, said email message received from an email sender:

retrieving an instant message address for said email sender from storage;

associating said instant message address of said email sender with an instant message composed by said email recipient;

transmitting said instant message to said instant message address using said instant message application, wherein an email address associated with said email sender is mapped to a corresponding instant message address associated with said email sender;

transmitting history data along with said instant message, said history data including communications exchanges previously conducted between said email recipient and said email sender;

determining whether said email sender is available to receive said instant message; and in response to determining that said email sender is unavailable to receive said instant message and in response to receiving a request from said email sender to defer, storing said instant message and periodically retransmitting said instant message;

wherein said communications exchanges include at least one of: email messages; instant messages; and attachments; and in response to receiving a request by an instant message recipient to respond to an instant message using an email application:

retrieving an email address for an instant message sender from storage;

associating said email address of said instant message sender with an email message composed by said instant message recipient; and transmitting said email message to said email address using said email application;

wherein an instant message address associated with said instant message sender is mapped to a corresponding email address associated with said instant message sender;

transmitting additional history data along with said email message, said additional history data including communications exchanges previously conducted between said instant message recipient and said instant message sender;

wherein said communications exchanges previously conducted between said instant message recipient and said instant message sender include at least one of: email messages; instant messages; and attachments; and sending a notification of successful transmission to said instant message recipient.

2. The method of claim 1, flirt her comprising:

sending a notification of successful transmission to said email recipient in response to determining said email sender is available to receive said instant message; and in response to determining said email sender is unavailable to receive said instant message and in response to receiving a request from said email sender to send content of said instant message in a response email message, transferring said content of said instant message to an email application resulting in said response email message and transmitting said response email message to said email sender.

3. The method of claim 2, wherein said content includes:
message text;
recipient addresses;
sender addresses; and
history data.

4. The method of claim 1, wherein said history data is stored on both of said email recipient's and said email sender's storage systems.

5. The method of claim 1, further comprising deploying process software for providing said interoperability of email and instant messaging services, said deploying comprising:

installing said process software on at least one server;

identifying server addresses for users accessing said process software on said at least one server;

installing a proxy server if needed;

sending said process software to said at least one server and copying said process software to a file system of said at least one server;

sending the process software to at least a first client computer; and executing said process software on said first client computer.

6. The method of claim 5, wherein said installing said process software further comprises:

determining if programs will reside on said at least one server when said process software is executed;

identifying said at least one server that will execute said process software; and transferring said process software to storage for said at least one server.

7. The method of claim 5, wherein said sending said process software to said first client computer further includes having said at least one server automatically copy said process software to said first client computer, and running an installation program at said first client computer to install said process software on said first client computer.

8. The method of claim 5, wherein said sending said process software to said first client computer further comprises identifying a user and an address of said first client computer.

9. The method of claim 5, wherein said sending said process software to said first client computer includes sending said process software to at least one directory on said first client computer.

10. The method of claim 5, wherein said sending said process software to said first client computer includes sending said process software to said first client computer via e-mail.

11. The method of claim 1, further comprising integrating process software for providing said interoperability of email and instant messaging services, said integrating comprising:

determining if said process software will execute on at least one server;

identifying an address of said at least one server;

checking said at least one server for operating systems, applications, and version numbers for validation with said process software, and identifying any missing software applications for said at least one server that are required for integration;

updating said at least one server with respect to any operating system and application that is not validated for said process software, and providing any of said missing software applications for said at least one server required for said integration;

identifying client addresses and checking client computers for operating systems, applications, and version numbers for validation with said process software, and identifying any software applications missing from said client computers that are required for integration;

updating said client computers with respect to any operating system and application that is not validated for said process software, and providing any missing software application for said client computers required for said integration; and installing said process software on said client computers and said at least one server.

12. The method of claim 1, further comprising on demand sharing of process software for providing said interoperability of email and instant messaging services, said on demand sharing comprising:

creating a transaction containing unique customer identification, requested service type, and service parameters;

sending said transaction to at least one main server;

querying said at least one main server about processing capacity associated with said at least one main server to help ensure availability of adequate resources for processing of said transaction; and allocating additional processing capacity when additional capacity appears needed to process said transaction, said additional processing capacity being selected from the group of additional capacities consisting of central processing unit capacity, processor memory capacity, network bandwidth capacity, and storage capacity.

13. The method of claim 12, further comprising recording a plurality of usage measurements selected from the group of usage measurements consisting of network bandwidth, processor memory, storage, and central processing unit cycles.

14. The method of claim 13, further comprising:
summing said usage measurements;
acquiring at least one multiplicative value associated with said usage measurements and with unit costs; and
recording any such acquired multiplicative value as an on demand charge to a requesting customer.

15. The method of claim 14, further comprising at least one of:
posting said on demand charge on a web site if requested by said requesting customer; and
sending said on demand charge via e-mail to said requesting customer's e-mail address.

16. The method of claim 14, further comprising charging said on demand charge to said requesting customer's account if an account exists and if said requesting customer has selected a charge account payment method.

17. The method of claim 1, further comprising deploying, accessing, and executing process software for providing said interoperability of email and instant messaging services, said deploying, accessing, and executing process software implemented through a virtual private network, the method further comprising:
determining if a virtual private network is required;
checking for remote access to said virtual private network when it is required;
if said remote access does not exist, identifying a third party provider to provide secure, encrypted connections between a private network and remote users;
identifying said remote users; and
setting up a network access server operable for downloading and installing client software on desktop computers for remote access of said virtual private network;
accessing said process software;
transporting said process software to at least one remote user's desktop computer; and
executing said process software on said at least one remote user's desktop computer.

18. The method of claim 17, further comprising:
determining if said virtual private network has a site-to-site configuration for providing site-to-site access, and if said virtual private network is not so available, installing equipment required to establish a site-to-site configuration for said virtual private network;
installing large scale encryption into said site-to-site virtual private network; and
accessing said process software through said site-to-site configuration with large scale encryption.

19. A storage medium including machine-readable computer program code for providing interoperability of email and instant messaging services, the storage medium including instructions for causing a computer to implement a method, comprising:
in response to receiving a request by an email recipient to respond to an email message using an instant message application, said email message received from an email sender:
retrieving an instant message address for said email sender from storage;
associating said instant message address of said email sender with an instant message composed by said email recipient;
transmitting said instant message to said instant message address using said instant message application, wherein an email address associated with said email sender is mapped to a corresponding instant message address associated with said email sender;
transmitting history data along with said instant message, said history data including communications exchanges previously conducted between said email recipient and said email sender;
determining whether said email sender is available to receive said instant message; and
in response to determining that said email sender is unavailable to receive said instant message and in response to receiving a request from said email sender to defer, storing said instant message and periodically retransmitting said instant message;
wherein said communications exchanges include at least one of: email messages; instant messages; and attachments; and
in response to receiving a request by an instant message recipient to respond to an instant message using an email application:
retrieving an email address for an instant message sender from storage;
associating said email address of said instant message sender with an email message composed by said instant message recipient; and
transmitting said email message to said email address using said email application;
wherein an instant message address associated with said instant message sender is mapped to a corresponding email address associated with said instant message sender;
transmitting additional history data along with said email message, said additional history data including communications exchanges previously conducted between said instant message recipient and said instant message sender;
wherein said communications exchanges previously conducted between said instant message recipient and said instant message sender include at least one of: email messages; instant messages; and attachments; and
sending a notification of successful transmission to said instant message recipient.

20. An integrated messaging system for providing interoperability of email and instant messaging services, comprising:
a host system comprising a processor and memory for executing an integrated messaging system;
a link to a first client system associated with an email sender, said first client system executing a first email application and a first instant message application;
a link to a second client system associated with an email recipient, said second client system executing a second email application and a second instant message application;
a request to reply to an email message received from said email sender using an instant message application;
wherein in response to said request, said integrated messaging system performs:

in response to retrieving an instant message address for said email sender from storage:
- associating said instant message address of said email sender with an instant message composed by said email recipient;
- transmitting said instant message to said instant message address using said instant message application, wherein an email address associated with said email sender is mapped to a corresponding instant message address associated with said email sender;
- transmitting history data relating to said instant message, said history data being transmitted along with said instant message;
- determining whether said email sender is available to receive said instant message; and
- in response to determining that said email sender is unavailable to receive said instant message and in response to receiving a request from said email sender to defer, storing said instant message and periodically retransmitting said instant message;
- wherein said history data includes communications exchanges previously conducted between said email recipient and said email sender; and
- wherein further said communications exchanges include at least one of: email messages; instant messages; and attachments and in response to receiving a request by an instant message recipient to respond to an instant message using an email application:
- retrieving an email address for an instant message sender from storage; associating said email address of said instant message sender with an email message composed by said instant message recipient; and
- transmitting said email message to said email address using said email application;
- wherein an instant message address associated with said instant message sender is mapped to a corresponding email address associated with said instant message sender;
- transmitting additional history data along with said email message, said additional history data including communications exchanges previously conducted between said instant message recipient and said instant message sender;
- wherein said communications exchanges previously conducted between said instant message recipient and said instant message sender include at least one of: email messages; instant messages; and attachments; and
- sending a notification of successful transmission to said instant message recipient.

* * * * *

UNITED STATES PATENT AND TRADEMARK OFFICE
CERTIFICATE OF CORRECTION

PATENT NO. : 7,610,340 B2  Page 1 of 1
APPLICATION NO. : 10/605572
DATED : October 27, 2009
INVENTOR(S) : Kelley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1076 days.

Signed and Sealed this

Fourteenth Day of December, 2010

David J. Kappos
*Director of the United States Patent and Trademark Office*